United States Patent
Nissim

(10) Patent No.: US 8,370,261 B2
(45) Date of Patent: Feb. 5, 2013

(54) SYSTEM AND A METHOD FOR ACCESS MANAGEMENT AND BILLING

(76) Inventor: Amnon Nissim, Tel-Aviv (IL)

(*) Notice: Subject to any disclaimer, the term of this patent is extended or adjusted under 35 U.S.C. 154(b) by 816 days.

(21) Appl. No.: 11/878,234

(22) Filed: Jul. 23, 2007

(65) Prior Publication Data

US 2008/0167970 A1 Jul. 10, 2008

Related U.S. Application Data

(60) Provisional application No. 60/879,532, filed on Jan. 10, 2007.

(51) Int. Cl.
*G06F 21/00* (2006.01)
*G06Q 30/00* (2006.01)

(52) U.S. Cl. ........... 705/51; 705/26.1; 705/52; 380/227; 380/228; 380/229; 380/230

(58) Field of Classification Search ............... 705/51
See application file for complete search history.

(56) References Cited

U.S. PATENT DOCUMENTS

| | | | |
|---|---|---|---|
| 6,256,671 B1* | 7/2001 | Strentzsch et al. | 709/227 |
| 6,460,141 B1* | 10/2002 | Olden | 726/4 |
| 7,013,001 B1 | 3/2006 | Felger | |
| 7,065,571 B2 | 6/2006 | Schweitzer et al. | |
| 7,162,508 B2* | 1/2007 | Messina | 709/200 |
| 7,577,092 B2* | 8/2009 | San Andres et al. | 370/230 |
| 7,721,103 B2* | 5/2010 | Risan et al. | 713/176 |
| 7,739,744 B2* | 6/2010 | Burch et al. | 726/26 |
| 7,761,382 B2* | 7/2010 | Becker et al. | 705/51 |
| 7,852,861 B2* | 12/2010 | Wu et al. | 370/401 |
| 7,870,385 B2* | 1/2011 | Risan et al. | 713/165 |
| 2002/0194378 A1* | 12/2002 | Foti | 709/246 |
| 2003/0154136 A1* | 8/2003 | Bittmann et al. | 705/26 |
| 2004/0107143 A1* | 6/2004 | Niemi | 705/26 |
| 2004/0193906 A1* | 9/2004 | Dar et al. | 713/200 |
| 2006/0015472 A1* | 1/2006 | Ahlander et al. | 707/1 |
| 2006/0031168 A1* | 2/2006 | Remi | 705/52 |
| 2006/0280191 A1* | 12/2006 | Nishida et al. | 370/401 |

OTHER PUBLICATIONS

Liu, Q. et al., 2003, Digital Rights Management for Content Distribution, Australian Computer Society, vol. 21.*
Hartung, F. et al., Nov. 2000, Digital rights management and watermarking of multimedia content for m-commerce applications, Communications Magazine, vol. 38, Issue 11, pp. 78-84.*

* cited by examiner

*Primary Examiner* — Bradley B Bayat

(57) ABSTRACT

An access management system for managing network access of an end-user to one or more online content sources of a number of content providers. The system comprises a content proxy unit that stores the concealed addresses of the content sources. The content proxy unit is designed to receive a request for accessing one or more content sources from the end-user. The system further comprises an access management unit that stores an access rights record of the end-user. The access management unit is designed to authorize the request according to the access rights record of the end user. If the request is authorized, the content proxy unit facilitates the accessing using the concealed addresses of the requested content sources.

33 Claims, 6 Drawing Sheets

SYSTEM AND A METHOD FOR ACCESS MANAGEMENT AND BILLING

RELATIONSHIP TO EXISTING APPLICATIONS

The present application claims priority from Provisional U.S. Patent Application No. 60/879,532, filed on Jan. 10, 2007, the contents of which are hereby incorporated by reference.

FIELD AND BACKGROUND OF THE INVENTION

The present invention relates to a system and a method for access management and billing and, more particularly, but not exclusively to a system and a method for access management and billing of online content over computer networks.

During the last decade, the Internet has become a widely used source of information, providing enormous amounts of content to end-users all over the world. As the Internet has no central management and users are not listed by any administrative entity, billing and monitoring users for accessing content and receiving services is performed by independent online billing systems and accounting applications. Such independent billing systems are usually operated and managed by the providers of the contents and services. Usually, a content provider that offers a billable content or service uses a billing application or a billing system for managing the access to the billable content and billing the end-users for such an access.

As many of the billing systems are independent and do not have any information about internet users, end-users have to subscribed before they can access the content they are managed. In many known billing methods and systems, end-users pay for a time-limited subscription that allows them to access content for a set period. As different content providers use different billing systems, end-users acquire separate subscriptions that allow them to access content in separate sites or databases. For each subscription, the end-user has to maintain related account information, such as personal identification information, for example a username and a password, subscription expiration date, etc. In addition, the end-user has to provide his or her identification whenever he or she wants to access one of the websites or databases.

Billing systems and methods for billable content and services are now the subject of much activity as well as research. Billing systems for both general and specific purposes abound. For example, common models for billing online content are usually based on the connection time between two terminals at a given transmission rate, the quantity of data exchanged between two terminals, or the data-transmission rate. Usually, such models are implemented on the server or the computer system of the content provider that offers the access to its resources.

For example, U.S. Pat. No. 7,065,571, issued on Jun. 20, 2006, discloses a system, a method and a computer program product for policy-based billing of network sessions. Initially, a plurality of packets is received by a plurality of analyzers. Thereafter, the packets are aggregated. Next, the packets are analyzed to identify a plurality of flows and the session is associated with the flows. At least one application associated with the session is also identified. The session is then reconstructed utilizing the identified application. A user associated with the session is then identified along with a policy. The user is then billed for the session in accordance with the policy.

Another example for such a billing system is disclosed in U.S. Pat. No. 7,013,001, issued on Mar. 14, 2006 that describes a method of billing a communication session between a user and a value-added service. A request is received from a user for a communication session, such as a circuit-switched call, a computer-network telephony call or a multimedia session, between the user and a value-added service. Information associated with a credit account is requested before the user is connected to the value-added service. The information associated with the credit account, such as credit card information, debit card information or checking account information, is received in real time. Credit account information, which includes the received information is associated with the credit account and a predetermined amount that is to be charged to the credit account, is communicated to a payment authorization database, which can be located locally or remotely. Alternatively, the credit account information includes the received information associated with the credit account and a predetermined amount that is to be set aside in the credit account for the communication session. Payment authorization information associated with the credit account is received from the remote site before the user is connected to the value-added service. The user is connected to the value-added service when the payment authorization information is affirmative. A total charge for the communication session that is based on an actual time that the user is connected to the value-added service is calculated when the communication session is terminated. Lastly, session charge information, which is associated with the communication session, is transmitted to the remote site when the communication session is terminated, the session charge information including information for charging the credit account an amount representing a charge for the communication session.

The aforementioned methods and systems are designed for a designated service or content service and do not provide a solution to content providers that do not manage a special billing system.

SUMMARY OF THE INVENTION

According to one aspect of the present invention there is provided an access management system for managing network access of an end-user to one or more online content sources of a plurality of content providers. The access management system comprises a content proxy unit that stores a concealed address of each one of the content sources. The content proxy unit receives a request for an access to one or more of the plurality of content sources from the end-user. The access management system further comprises an access management unit configured for storing an access rights record pertaining to the end-user. The access management unit authorizes the request according to the access rights record. The content proxy unit is configured for facilitating the access using at least one of the concealed addresses of the at least one content source in the request.

According to one aspect of the present invention there is provided an access managing method for managing network access of an end-user to one or more of a plurality of online content sources of a plurality of content providers. The end-user is connected to a computer network. The access managing method comprises: a) identifying a concealed address of each one of the plurality of content sources, each the plurality of content sources having a concealed address, each the concealed address being associated with one of the plurality of online content sources, b) receiving a request for an access to at least one of the plurality of content sources from the end-user, c) verifying if the end-user is authorized to receive the access, and d) using at least one of the concealed addresses for allowing the access, the used concealed addresses being associated with the requested content sources.

According to one aspect of the present invention there is provided an access management system for allowing a plurality of content providers to jointly restrict access to their content, the content being stored at a respective provider. The access management system comprises a common access proxy that provides a plurality of content provider accounts. Each one of the content provider accounts comprises a concealed address and a public address of a content source. The concealed address is an address leading to respective content at the provider, and the public address being published. The common access proxy is configured for receiving from an end-user a request comprising at least one of the public addresses for accessing a corresponding content source. The system further comprises a verification unit that verifies the end-user in response to the request. The common access proxy facilitates the verified end-user to access the requested content source at the corresponding concealed address without providing the concealed address to the verified end user.

According to one aspect of the present invention there is provided a billing system for allowing a plurality of vendors to bill an end-user for ordering their products. The billing system comprises an access management unit configured for storing a user balance pertaining to an end-user and a plurality of vendor accounts, each the vendor account associated with a vendor balance and at least one purchase address associated with a related product and a purchase charge and a common access proxy configured for receiving a purchase request comprising a first address of the at least one purchase address from the end-user. The access management unit being configured for authorizing the purchase request according to a respective the purchase charge and a respective the user balance, the access management unit being configured for updating the vendor and user balances according to the authorized purchase request.

Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of the method and system of the present invention involves performing or completing certain selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions are executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DESCRIPTION OF THE PREFERRED EMBODIMENTS

Figure 1:
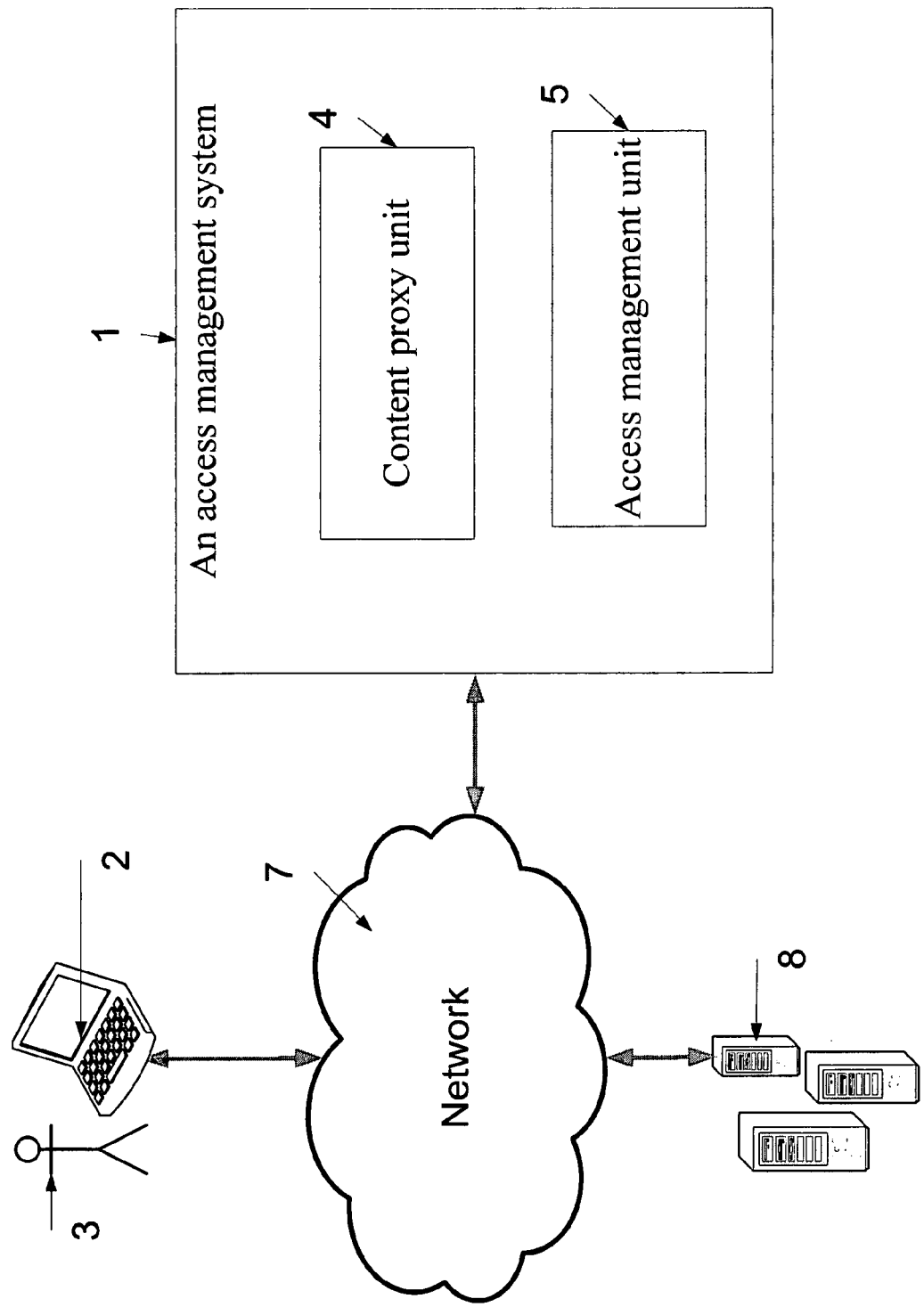
FIG. 1 is a schematic illustration of an access management system for managing the access of an end-user, which is connected to a network via a user terminal, to content sources of a number providers, according to a preferred embodiment of present invention.

The present embodiments comprise an apparatus, a method, and a system for managing accesses of end-users to a plurality of online content sources of different content providers. In one embodiment of the present invention, a central managing access system that allows a number of content providers to manage the access of end-users to their content sources is provided. The central managing access system may be used for billing end-users for the access to the content sources. The central managing access system may allow the content providers to manage network accesses of the end-users to the content sources. In such a manner, each one of the content providers may manage the access of end-users to its content sources without making any substantial change, update, or supplement to the system, domain, or sub-domain that hosts the content sources. Optionally, the access management system bills end-users for accessing the content sources. In such a manner, a content provider may transform his content sources to billable content sources without installing a designated billing system or module.

The principles and operation of an apparatus and method according to the present invention may be better understood with reference to the drawings and accompanying description.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. In addition, it is to be understood that the phraseology and terminology employed herein is for the purpose of description and should not be regarded as limiting.

A user terminal may be understood as a personal computer, a laptop, a server, a thin client, a mobile phone, and a personal digital assistant (PDA).

A computer network or a network may be understood as an IP-based network, the Internet, a local Ethernet, a Virtual Private Network (VPN), a WLAN, a LAN, a wireless network, or the combination thereof.

A content source may be understood as a webpage, a video sequence, an audio sequence, a document, a chart, a datasheet, an image, an on-line application, an online service, such as a spreadsheet, a document editor, an image editor, and a calculator, etc.

A content indicator may be understood as a uniform resource locator (URL), an IP address, a relative address, an absolute address, etc.

An access or a network access may be understood as downloading a copy of a content source, receiving a video stream of a content source, receiving an audio stream of a content source, browsing one or more webpages, coping images or documents, etc.

A concealed address may be understood as a redirected IP address, a redirected URL, a redirected relative address, a redirected absolute address, a redirected pointer, and a redirected server address, or any address that is not available to end-user via a network search.

Reference is now made to FIG. 1, which is a schematic illustration of an access management system 1 for managing the access of an end-user 3, which is connected to a network 7 such as the Internet via a user terminal 2, to online content sources of different content providers which are stored on one or more domains or sub-domains 8.

The access management system 1 comprises an access management unit 5 that stores an access rights record that pertains to the end-user 3. The access management system 1 further comprises a content proxy unit 4. The content proxy unit 4 establishes a communication session that allows the end-user 3 to access content sources, which are hosted in a domain 8 or a content provider. Optionally, the content proxy unit 4 stores a number of content indicators, each associated with an actual address of the content source. Each one of the actual addresses, which are not publicly available over the network 7, contains a concealed internet protocol (IP) address and optionally a concealed domain name of the domain 8 that hosts one or more of the content sources. As the concealed IP address and the concealed domain name are not publicly available over the network 7, end-users cannot use it directly to access the content sources which are hosted in the related domains 8. For example, the content source may reside on the site www.foo.com/premium that is only available to access by the access management system 1. Calls to access the address www.foo.com/premium are directed to the access management system 1. When a user accesses any URL with the prefix www.premium.foo.com, the access management system reads the source content from the concealed address and presents it to the user.

As described above, the content sources are hosted in domains having concealed addresses, which are not known to the end-users, and optionally cannot be used for accessing the content source. The content proxy unit 4 receives an access request that comprises a content indicator from the end-user 3 and verifies whether to allow him or her to access the related content source, or not. The verification is based on the access rights record that pertains to the user and stored in the access management system 1, as described below. After the access has been verified, the content proxy unit 4 establishes a communication session, which may be understood as an access session, between the end-user 3 and the domain 8 that hosts the requested content source. During the session the end-user may access the content source, for example by downloading a copy of the content source to his or her user terminal 2, receiving a multimedia stream of the content source to his or her user terminal 2, browsing one or more webpages, coping images or documents, etc.

It should be noted that though only one pair of an end-user 3 and a user terminal 2 are depicted in FIG. 1, a number of end-users 3 may be connected to the network 7 via a respective number of user terminals 2. Correspondingly, the access management unit 5 may store access rights records of a number of end-users 3. In addition, though only one block is used in order to depict each one of the units 4, 5, a number of servers may be used for fulfilling the activities of each one of the units 4, 5.

The content proxy unit 4 and the access management unit 5 may be connected to one another either directly or via the network 7. Optionally, each one of the units 4, 5 is installed on a separate server. Optionally, all the units 4, 5 are installed on a common server.

As described above, the access management unit 5 manages a number of access rights records. Optionally, each access rights record comprises end-user contact information that includes details needed to contact the related user.

Optionally, each access rights record comprises login information such as a username, a password, a certificate, or any combination thereof.

Optionally, each access rights record comprises end-user billing information such a credit card number, bank account details, etc. The end-user billing information defines how the user is to be billed.

Optionally, each access rights record comprises an anonymity level sub-record. The anonymity level sub-record defines whether the information that is stored in the access rights record should be available to the content providers or any other third parties or not. Optionally, the access management unit 5 allows the end-user 3 to define the anonymity level of his or her access rights record when he or she subscribes to the services, which are provided by the access management system 1, or via a designated interface, as described below.

Optionally, the access management system 1 bills end-users for accessing the content sources. In such an embodiment, each access rights record optionally contains an end-user balance account that stores the balance of the related user. Optionally, each access rights record contains a set of rules that defines the terms for billing the end-user. The set of rules defines user specific usage rules, which are optionally provided by the content provider according to the service agreement it has with the related end-user.

Optionally, the end-user account balance stores the amount that has been deposited into a related bank account by related end-user. Optionally, the end-user account balance is updated according to the user charges that pertain to the accesses of the related end-user to the content source of the different content providers. Optionally, the end-user account balance is updated according to a fixed subscription fee that allows him or her to access one or more of the content source for a predefined period. Optionally, the end-user account balance is updated according to a recurring payment. In such an embodiment, every predefined period the end-user account balance is updated according to a predefined fee. For example, the account balance is charged every month with monthly subscription fees. Optionally, the end-user account balance updated according to an account of the end-user at a third party, such as the user's internet service provider (ISP) account.

Optionally, the access management unit 5 allows one or more end-users to update the account balance in his or her access rights record. Each record of the list includes a network address and optionally a chosen method that allows the communication with the related end-user 3, such as a private/public key-based method. The access management unit 5 allows each one of the end-users 3 to open an account and transfer funds thereto. In addition, the access management unit 5 may communicate with a billing server of a third party and may acquire funds therefrom when needed. For example, the access management unit 5 may establish a session with an ISP billing server that allows the access management system 1 to charge the end-user's ISP account for the access charges, which are documented in the balance account of the related end-user.

As described above, the access management system 1 bills end-users for accessing the content sources of different content providers. By using the access management system 1, an existing content provider bills end-users for accessing its content sources without installing a designated billing system or module, as described above. The access management system 1 optionally manages content provider accounts for each one of the content providers that it provides service thereto. Optionally, each content provider account comprises a collection of all of the information that is related to the content provider. A detailed example of such a collection is provided below.

Figure 2:
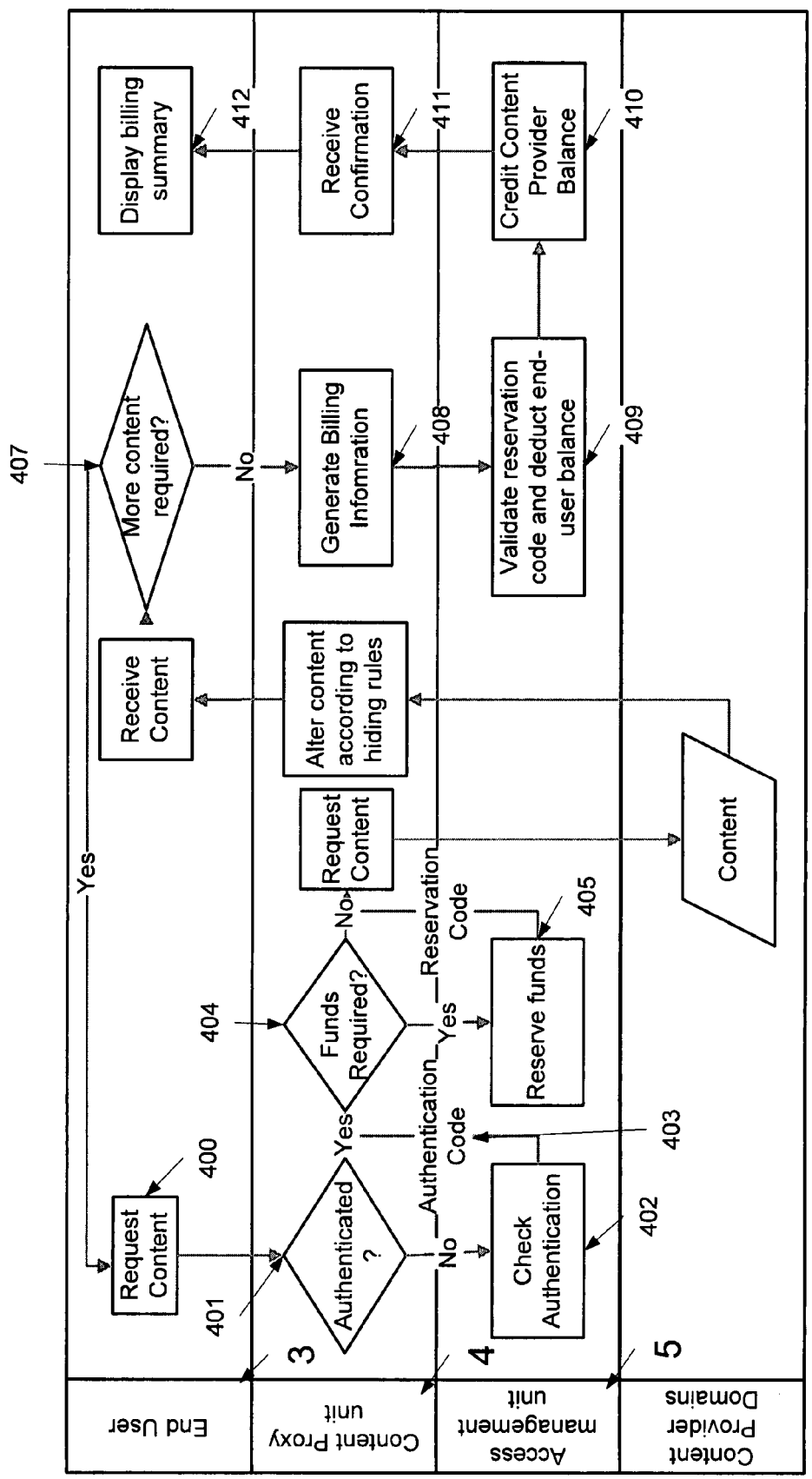
FIG. 2 is a sequence flowchart that depicts a number of time events occur which before, during, and after the establishment of a communication session between the end user and the content provider, according to one embodiment of the present invention.

Reference is now made jointly to FIG. 1 and to FIG. 2, which are a sequence flowchart that depicts a number of time events occur which before, during, and after the establishment of a communication session between the end user 3 and the content provider, according to one embodiment of the present invention. As described above, and depicted in 400, 401 the content proxy unit 4 receives an access request from the end-user 3 and verifies whether it is authorized or not. Optionally, as shown at 402, the access management unit 5 authenticates the aforementioned request. When the one or more of the content proxies 4 detects a new session it sends an authentication request to the access management unit 5 with a user authentication data which is derived from the new session. If the authentication succeeds, the access management unit 5 assigns the content proxy unit 4 with an authenticated session code 403. Later, when the end-user 3 tries to access the content source, the content proxy unit 4 receives the access request with the accessible content address and issues a billing request that includes a charging amount for accessing the content source and the assigned authenticated session code, as shown at 404. The access management unit 5 verifies the authenticated session code and deduces the charging amount from the balance account of the end-user in the related access rights record.

Optionally, as shown at 405, the access management unit 5 reserves funds according to the billing requests. In such a manner, if the end-user initiates multiple sessions, the access management unit 5 allows access only to sessions that the end-user has enough resources to pay for.

Optionally, the access management unit 5 stores information about each one of the sessions that a certain end-user performed. In such a manner, the end-user may receive detailed reports that document his or her usage in the service provided by the access management system.

As described above, the content source is stored in a domain having a concealed address that is not publicly available to the end-users. In order to avoid disclosing the concealed address to the end-user 3, the content proxy unit 4 optionally alters the concealed address before it is delivered to the end-user 3, as shown at 406. The set of hiding rules defines how such an alteration is performed. For example, if the content source is a webpage having the actual address www.foo.com/blabla/bar.html, the set of hiding rules may define how to alter the actual address in a manner that conceals it from the end-user, for example by altering the actual address to the fake address www.foo.com/albalb/bar.html. In such a manner, even if the end-user 3 has a possible network connection with the domain 8 that hosts the content source, he or she does not know the exact address in the domain 8 and therefore cannot access it directly. Optionally, the set of hiding rules defines the content source in a manner that it is accessible via the content proxy unit 4.

Optionally, the content proxy unit 4 forwards rate information to the user terminal before the access is granted. The user terminal displays the rate information to the end-user, informing him or her about the access charges to the requested content source. Optionally, the end-user is asked to confirm the access charges. If the access charges are confirmed, the content proxy unit 4 requests from the access management unit 5 to reserve funds for the access charges, as described above and shown at 405. It should be noted that after the access request has been authorized, the access session may continue until more content is required or until the end-user terminates the session, as shown at 407.

Optionally, the billing is determined according to content characteristics, such as access rate, authorized users list, a list of different access rates for different groups of end user, etc. The content characteristics may be understood as the scope of the content source. Optionally, the content characteristics are stored in the content proxy unit 4. A certain scope may pertain to one or more content sources. The scope may be defined in lists, which are stored in or accessible to content proxy unit 4. When a certain access request is received from an end-user, the content proxy unit 4 identifies the scope of the requested content source, optionally by matching the content address in the access request with the content proxy unit 4. Optionally, the content proxy unit 4 stores a list with multiple network addresses. Each network address corresponds with a different content provider. In such an embodiment, the scope of the access request may be identified according to the network address of a certain content provider. Optionally, if the scope is not found, then the access request is rejected. Once the scope is found, the content proxy verifies whether the content source is defined as a billable content or not.

Optionally, the billing is determined according to custom tags, which are added to the related content sources by the content provider. Such tags provide the content proxy unit 4 billing information, which is related to the content source, such as access charges and terms. Optionally, the content proxy unit 4 removes the custom tags before it forwards the content source to the end user.

Optionally, after the scope has been identified, an authorization request is sent to the end-user. For example, the authorization request is a webpage with an explanation of the service, a command line for entering a username and a password, and a link to a webpage that facilitates the end-user to create a service account in the access management system 1. The webpage is displayed on the user terminal 2 and allows the end-user 3 to input authentication data. The authentication data is forwarded to the access management system 1 and used by the content proxy unit 4 for contacting the access management unit 5 and requesting access authentication therefrom.

Optionally, a number of access management units 5 are used. In such an embodiment, the access management unit 5 that hosts the record of the related end-user 3 is identified according to the prefix or a suffix of the username or alternatively, according to the server that directs the related content proxy unit 4 thereto.

The access charges are determined according to the billing method that is relevant for the aforementioned scope and optionally according to a set of reservation rules. The set of reservation rules are used for instructing the content proxy unit 4 to allow moderated access, which is determined according to the billing method. For example, if the billing method is a time based billing method, the content proxy reserves enough funds from the end-user balance account to be enough for a time-limited session, such as a three minutes session. When the time limit session elapses or about to elapse the content proxy unit 4 allocates funds for another time-limited session from the end-user account. Funds, which are reserved from the end-user balance account, cannot be claimed by a different end-user. Such an embodiment ensures that even if the end-user accesses several contents simultaneously, his or her account has enough funds for a number of accesses to one or more content sources. Optionally, the access management unit 5 acquires the funds directly from another account of the end-user, for example by charging an end-user account that is managed by a third party for the related end-user, such as an account that is managed by an ISP for the end-user. In such an embodiment, the access management unit 5 may authorize the reservation of finds even if there are not enough funds in the balance account of the related end-user.

Optionally, when the reservation of funds is approved, the content proxy unit 4 receives a reservation approval code (RAC) from the access management unit 5, as described above and shown at 405. Once the RAC is received, the content proxy unit 4 retrieves the requested content source according to the set of hiding rules, as described above.

Optionally, the content proxy unit 4 adds billing information to the data taken from the content source. For example, if the content source comprises hypertext markup language (HTML) pages, the billing information is placed in an HTML frame that is presented together with the HTML pages. In such a manner, the user terminal 2 displays a browser interface with two sub-windows, one with the billing information and the other with the content source. The billing information frame is constantly updated with billing information from the related access rights record, such as the balance account etc.

In such an embodiment, if the end-user requests content from a different scope that is handled by the same content proxy unit 4 and has the same the rate and billing method, the end-user 3 does not have to be re-authenticated. However, if the rate, the billing method, or both are different, an optional notification message is displayed to the end-user that requests him or her to approve the new billing information. Optionally, the end-user may choose to approve any new billing information automatically, thereby to avoid receiving the aforementioned notification messages. Optionally, the content proxy unit 4 acts according to the set of reservation rules.

After the access session has been terminated, the content proxy unit 4 generates a summary of the billing for the access session, as shown at 408, and forwards it to the access management unit 5 that update the balance account of the end-user accordingly, as shown at 409. Then, the credit account of the related one or more content providers is updated, and shown at 410 and a payment conformation is sent to the content proxy, shown at 411. Optionally, the billing information is forwarded to the user-terminal that displays it to the end-user, as shown at 412.

Figure 3:
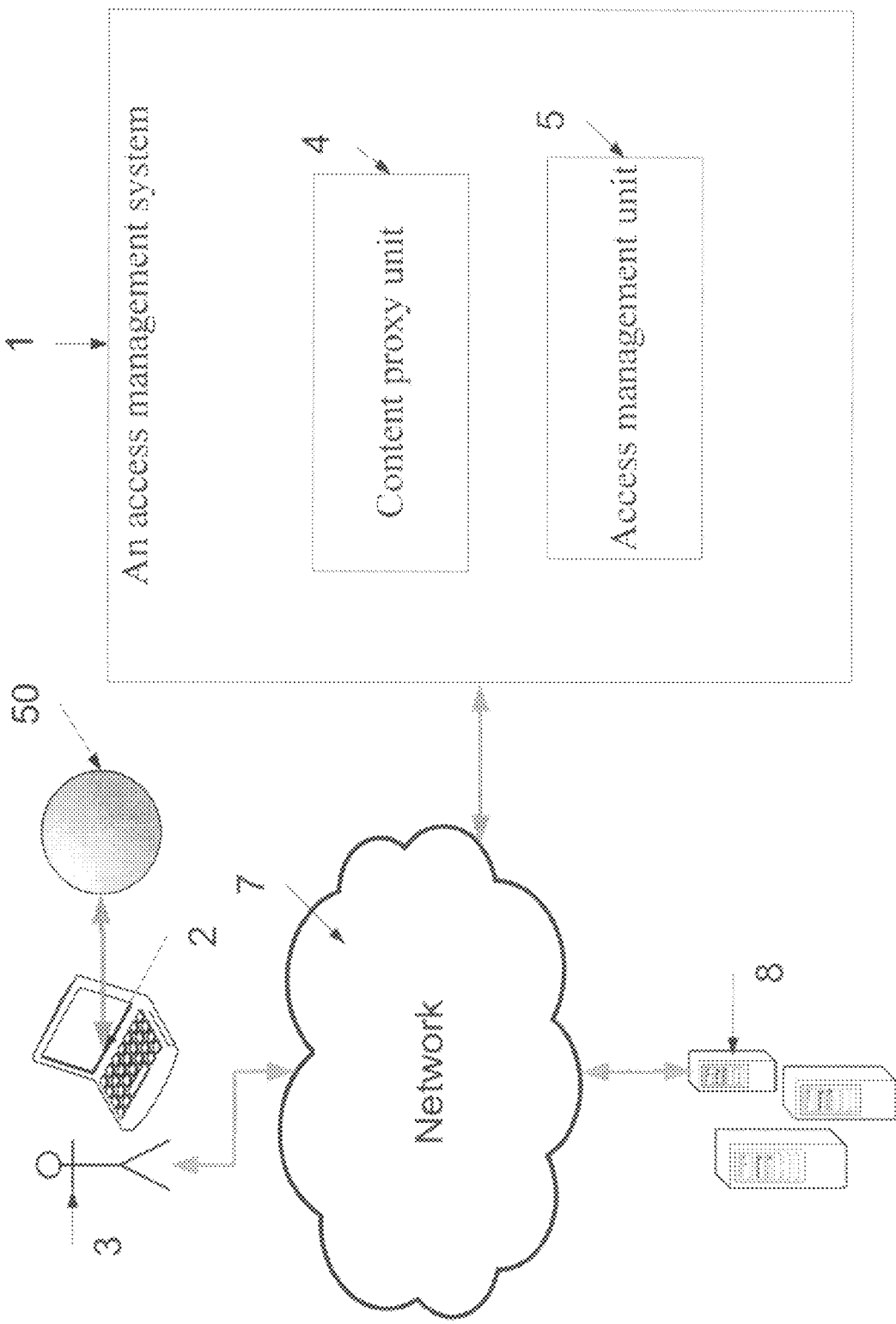
FIG. 3 is a schematic illustration of the access management system that is depicted in FIG. 1 and a supporting application program that is installed in the user terminal, according to one embodiment of the present invention.

Reference is now made to FIG. 3, which is a schematic illustration of the access management system 1 that is depicted in FIG. 1 and a supporting application program 50 that is installed in the user terminal 2, according to one embodiment of the present invention. Optionally, the supporting application program 50 communicates with the content proxy unit 4 and may receive billing information therefrom. The supporting application program 50 allows the user terminal to display the billing information to the end-user 3 according to his or her requests. Optionally, the supporting application program 50 performs automatic authentication of the user details. In such an embodiment, the content proxy unit 4 detects the supporting application program 50 at the user terminal 2 and receives identification information, such as the username and the password therefrom. In such an embodiment, the end-user is identified automatically by the received identification information.

Preferably, the supporting application program 50 receives information from the access management system 1 and displays a UI on the screen of the user terminal 2 that presents the received information. The received information my include the access rate to a certain content source, the time elapsed since the user accessed a certain content source, a user balance account, information about the content provider or the hosting domain, etc. Optionally, the UI allows the end-user to customize the display thereof. Optionally, the supporting application program 50 allows the user to authenticate and approve one or more scopes, content providers, content sources, and rates of content sources in advance, thereby allow him or her to start a billable session without any confirmation.

Optionally, the end-user installs an electronic certificate on the user terminal that is needed in order to validate a certain username and password. In such an embodiment, the certain username and password may be used to access one of the content sources only when it provided from a user terminal 2 that hosts the electronic certificate. If such an electronic certificate is installed, the access management unit 5 checks the verification thereof before authenticating the access request of the end-user, as described above, for example according to a Rivest Shamir Adelman (RSA) algorithm, which is incorporated herein by reference. In use, when the managing access unit 5 receives a request for authentication, sends a request for a certificate from the supporting application program 50, receives the certificate, and processes it according to the RSA algorithm. Optionally, when the end-user 3 tries to access unapproved content source, the supporting application program 50 displays a message with the rate for the required content source and allows him or her to initiate an access session, as described above.

Optionally, the supporting application program 50 notifies the end-user when there is a rate change in one of the content sources. In such an embodiment, the end-user receives a message with the details of the rate and an option to either confirm or decline the access session. Optionally, the supporting application program 50 uses APIs of the hosting user terminal 2. The supporting application program 50 may be a Firefox™ extension, an Internet Explorer™ plug-in, a Java applet, an ActiveX component, a Flash application, or a dynamic HTML (DHTML) page.

Figure 4:
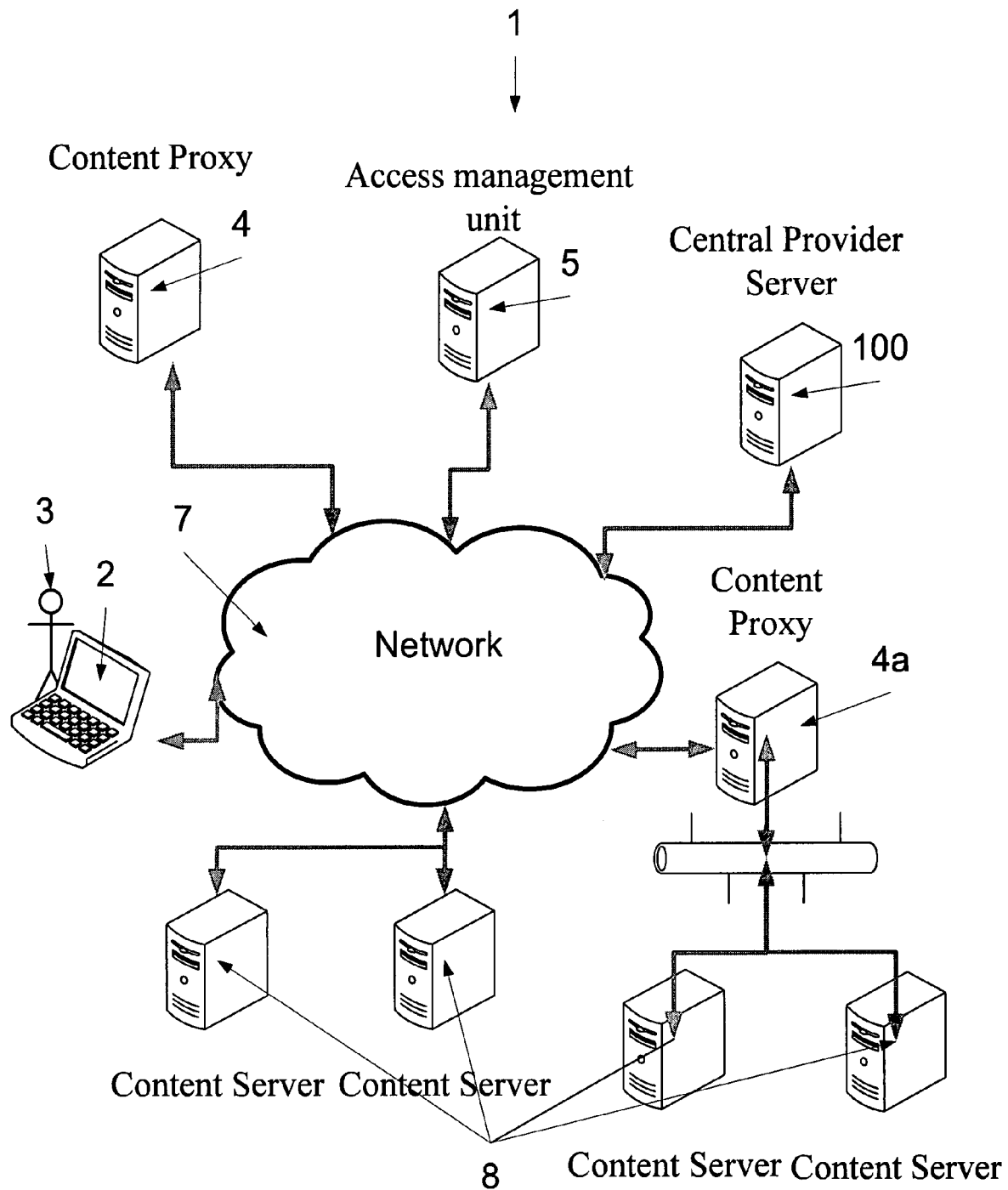
FIG. 4 is a schematic illustration of a distributed system for billing end-users that access online content sources of different content providers via user terminals that are connected to the network, according to one embodiment of the present invention.

Reference is now made to FIG. 4, which is a schematic illustration of a distributed system 1 for billing end-users that access the online content sources, which are hosted on the domains 8 of different content providers via the user terminals 2, as described above. The network 7, the access management unit 5, and the content proxy units 4 are as in FIG. 1. However, in FIG. 4 the aforementioned units 4, 5 are hosted on different servers, which are connected to the network 7, according to one embodiment of the present invention. In addition, FIG. 4 depicts a central content provider unit 100, which is used for providing services to content providers, as described below. Optionally, the central content provider unit 100 is part of or connected to the content proxy unit 4. Optionally, as depicted in FIG. 4, the system for billing end-users 1 comprises a number of content proxy units 4. In such an embodiment, each one of the units 4, 5 may be hosted on a different server. Moreover, as mentioned above, a number of content proxy units 4 may be used in order to connect different end-users to the servers 8.

As described above, each content proxy unit 4 is designed to receive access requests and optionally to alter any address of the content source that is provided therein.

Optionally, the content proxy unit 4 and may detect where an address of another content proxy unit 4 exists. If a first content proxy unit 4 founds an address of one or more other content proxy units 4, it alters the address to be directed to itself. When the end-user issues an access request with the address of the one of the other content proxy units 4, the first content proxy 4 generates a redirection of the access request with a special authentication code to itself and delivers the special authentication code to the other content proxy units. When the end-user accesses the one of the other content proxy units with the special authentication code, the special authentication code is compared with the special authentication code that has been delivered to the other content proxy units from the first content proxy, as described above. If the special authentication codes are the same, no authentication is needed.

This embodiment, along with other embodiments of the present invention, may provide a seamless end-user experience where the user does not need to re-authenticate when he or she access different sites within the same session. It should be noted that such an embodiment may be implemented using the access management unit 5. Briefly stated, the access management unit 5 acts as a mediator that receives all the communications from all the content proxy units and redirects them according to a central list of network addresses. Such an embodiment may be helpful when the content proxy units have limited connectivity, for example, when the content proxy units 4 are behind firewalls.

As described above, the billing method may be a time based billing method that calculates the accurate time of access sessions that a certain end-user performs. Optionally, the user terminal 2 hosts a supporting application program 50 that sends notifications to the content proxy unit 4 whenever a related end-user terminates a certain access session, for example, by shutting down the internet connection, browsing to another website, or closing the browser which is hosted on the user terminal 2.

Optionally, the content proxy unit 4 adds an add-on to the content source that is provided to the end-user. The add-on allows the end-user 3 to send an end-session request to the content proxy unit for ending the access session. For example, if the content source is HTML content, the user terminal 2 displays a button for ending the session. In use, the user uses the curser of the mouse for pressing the button, thereby sends a request to the content proxy unit 4 for ending the access session. Optionally, when time billing method is used, the user is charged for the time he or she accesses the content source. Accessing the content source may be understood as browsing, downloading, displaying, and modifying. Optionally, the charging is determined according to time units or fractions thereof.

As described above, the content proxy unit 4 may alter the data from the content source that it passes to the end-users 3. Optionally, the content proxy unit 4 adds automatic notifications that reflect whether the end-user 3 accesses the content source or not. Optionally, when time-based billing method is used, any external address in the data of the content source, such as an address of a provider other than the content provider unit may be redirected through the content proxy unit 4. Such an embodiment enables the content proxy unit 4 to detect the session terminations. Once the content proxy unit 4 receives such an external address, it closes the session and redirects the end-user to the requested external address. Optionally, before redirecting, the content proxy unit 4 forwards the user terminal 2 a notification message indicating that the session has been ended and billing information, which are related to the session.

Optionally, the content proxy may calculate the length of the session by the time between the first access to the content and the last access to the content. For example, in case of HTTP, the length of the session may be estimated by the time between the reception of an access request from the user and the last html page from the content source that is provided to thereto.

As described above, the end-user 3 receives access to the content sources during access sessions. When the session is over or timed out, by the end-user or by the content proxy unit 4, the content proxy unit 4 calculates the total bill for the session and sends it, optionally along with the aforementioned authentication and reservation codes, to the central content provider unit 100. The central content provider unit 100 validates the received billing information and sends it to the access management unit 5. The access management unit 5 deducts the total bill from the balance account of the access rights record of the related end-user and releases any unnecessary reservations. Optionally, an approval is sent back to the central content provider unit 100. The provider unit 100 credits the content provider that provides the content source according to the end-user sessions.

The central content provider unit 100 provides, optionally via the content proxy unit 4, a content provider user interface (UI) for allowing them to manage the access to their content sources. Such a UI allows the content provider to configure the aforementioned scopes, hiding rules, etc. Optionally, the central content provider unit 100 assigns an account with one or more access permissions for one or more content providers, which are connected via a certain content proxy unit 4. In addition, each one of the content providers may receive detailed reports from the content proxy units 4 that include reports of access, errors, access sessions etc.

As depicted in FIG. 4, the content proxy units 4 may be placed in a number of locations over the network 7. Optionally, the content proxy unit 4 is a module that is hosted by the domain 8 of the content provider. For example, if the domain 8 of the content provider is hosted in an Apache web-server, the content proxy unit 4 is implemented as a module written using Apache's application program interfaces (APIs). Optionally, the content proxy unit 4 is part of the content provider internal network, as shown at 4a. In such an embodiment, the content proxy unit 4 is preferably installed in front of the web server. In such a manner, the hosting service provider may provide its clients with the services of the access management system 1. Optionally, the content proxy unit 4 is hosted on a third party server.

As described above, the access management system 1 allows a number of content providers that operate in different domains 8 to manage network accesses to their content sources, optionally via the central content provider unit 100. Optionally, the access management system 1 allows the content providers to bill end-users for accessing predefined content sources. Optionally, each one of the content sources is billed according to a different set of billing rules. Billing of a certain content source may be performed according to different billing methods, such as fixed price, cost plus incentive, subscription, access time billing, and type of data billing that may be used by the access management unit 5 to drive the billing process, as described below. Preferably, each set of billing rules defines the billing method that is used for the related content source. Optionally, the set of billing rules defines the manner the billing method is applied. For example, if the billing method is based on time units, such as access time billing, the set of billing rules defines the time unit, for example a minute, a seconds, etc. and the tariff per time unit. If the billing method is based on data units, the set of billing rules defines the data unit, for example a kilobyte, ten kilobytes, a megabyte, etc. and the tariff per data unit. If the billing method is based on subscription, the set of billing rules defines the available subscription periods for the related content source and the price for each available subscription periods. For example, a one-year subscription costs $10 and a 3-months subscription costs $25. Each subscription may be defined with a renewal rate, optionally periodic, which is offered to the subscribers when the initial subscription ends. Optionally, the renewal is determined according to a predefined rule. For example, a 1-month subscription costs $10 and may be automatically renewed each month for a $10 fee. If the billing method is a one-time charge billing, the set of billing rules defines a fixed fee. Optionally, the user balance in the access rights record of the end-user is debited for the fixed fee and only then, a network access to the related content source is granted to the end-user.

Optionally, the access management system 1 is used for allowing the content providers to offer products and offline services to end users and to bill them for the purchasing thereof. For example, a specific billing rule, which is associated with a certain charge and a product or an offline service, is applied to a specific link. When the user accesses the specific link, he or she is billed with the associated charge, preferably as described above. Using an API, as described below, the access system notifies the Content Provider of the purchase, along with the shipping information of the End-User that is optionally taken from the access rights record that comprises the related end-user billing information.

Optionally, in such an embodiment, the billing rules define the number of times that the end-user may access the related content source for the fixed fee. Optionally, the billing rules define different fees, each grants a different number of network accesses to the content source. For example, it may be defined that an access fee for a one time access pass, a package of access passes, or an unlimited access pass to a certain content source.

Figure 5:
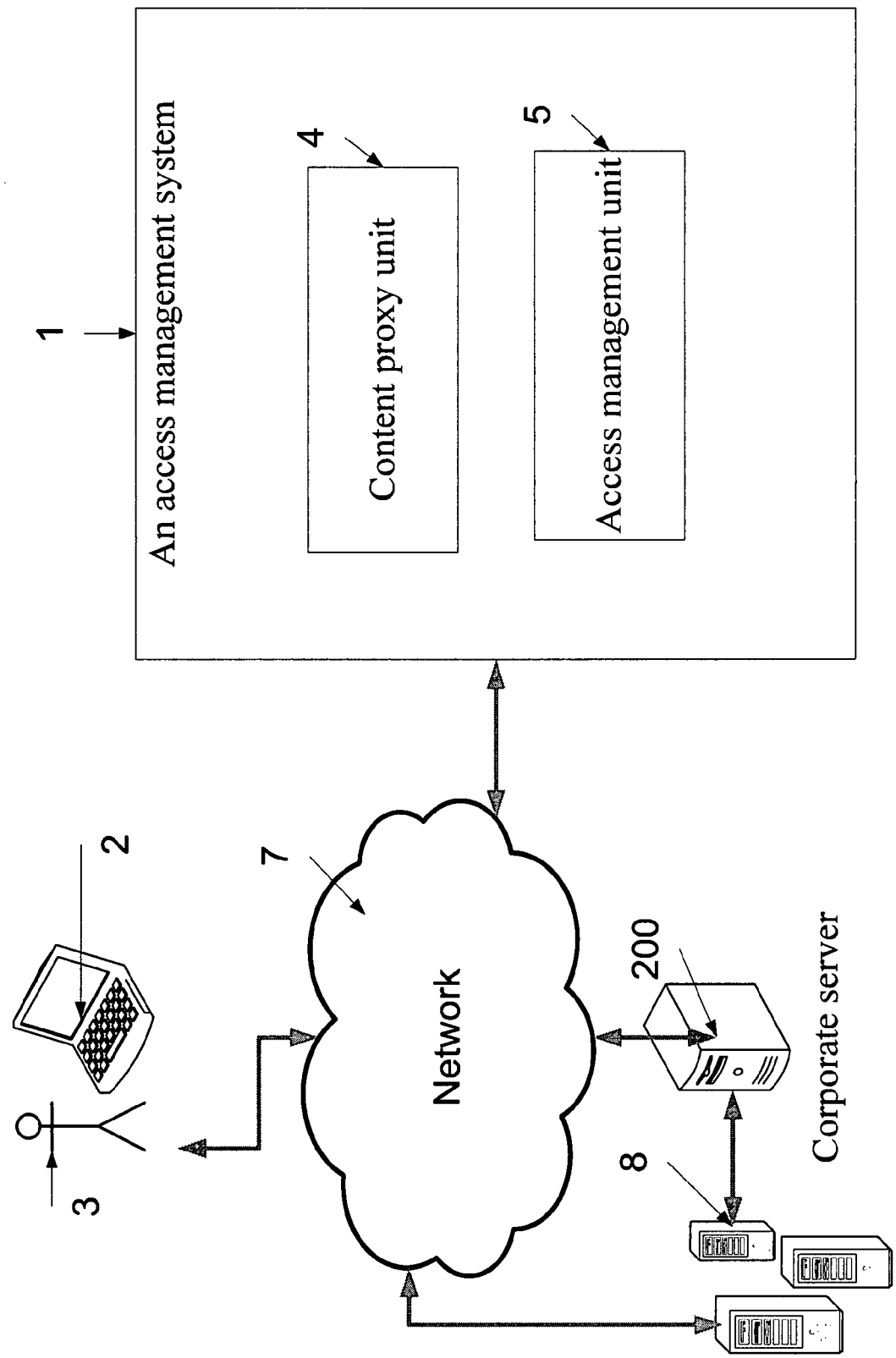
FIG. 5 is a schematic illustration of the access management system that is depicted in FIG. 1 and a corporate server that manages the access of end-users to the content sources of a certain content providers, according to one embodiment of the present invention.

Reference is now made to FIG. 5, which is a schematic illustration of the access management system 1 that is depicted in FIG. 1 and a cooperate server 200 for managing the access of end-users 3 to content sources which are hosted on one or more domains 8 a certain content provider, according to one embodiment of the present invention. Such a corporate server 200 allows content providers, such as enterprises, who want to manage the access to their billable content online, preferably from within their organization. The access management unit 5 manages an account for the corporate server 200. In such an embodiment, the access management unit 5 notifies the corporate server 200 whenever a request to access related content source is received from a certain end-user and request the cooperate server 200 to authenticate the end-user 3. Additionally, when content proxies units 4 request reservations of funds, the access management unit 5 requests an approval from the corporate server 200. Such an embodiment allows content providers to provide subscribers with the ability use usernames and passwords that have not been defined for the access management system 1 in order to access the content source and to provide all the users automatic balances for billable content. In such an embodiment, the content provider has control over the usage of its users, which may be employees. Optionally, the corporate server 200 allows access to sites, which have been predefined by the content provider. Optionally, the corporate server 200 allows end-users 3 to access the content source for a predefined period. Optionally, the corporate server 200 generates usage and balance reports.

Optionally, the access management unit 5 defines a set of quality of service (QoS) rules for one or more of the content sources. As the content sources are hosted on a domain which is connected to the network 7, as shown at 8, the availably thereof depends, inter alia, on the QoS of the network connection of the end-user. In order to avoid billing an end-user for content he or she did not receive, the set of QoS rules may define scenarios for billing or not billing end-users. For example, the set of QoS rules defines one or more conditions that define when and how the end user is billed, for example, defining that the end-user is billed only when a full delivery of a copy of the content source is completed. In another example, the set of QoS rules defines a condition that only if the transferring of the content to the end-user was disrupted one or more times or for a certain period, the end-user will not be billed.

Optionally, the access management unit 5 defines a set of editing permissions for each one of the content sources. The set of editing permissions defines the editing rights of some or all the end-users that access the related content source. For example, the set of editing permissions defines a number of end-users, which are allowed to read, write, and update the original copy of the content source that is stored in the domain of the content provider 8.

Optionally, the access management unit 5 comprises a content provider module. Optionally, the content provider module includes an application program interface (API) that allows, inter alia, the display of a designated GUI on the terminal of the content provider. Such a content provider module may be used for acquiring information about the end-user and or about the session of transmitting the content source to the end-user. The API allows the content provider or the operator of the access management system 1 to acquire information about the end-users that access related content sources. Optionally, the information acquired by the API is sent to the content provider after or before the content has been forwarded or transmitted to the requesting end-user 3. Optionally, the information acquired by the API is sent via a POST request to a specific URL. Optionally, after a communication session wherein content source has been forwarded, transmitted, or streamed to the end-user 3, the content proxy unit 4 sends a POST request to the specific URL with the acquired information.

Optionally, the content proxy unit 4 defines a set of identity rejections rules for each one of the content sources. The set of identity rejections rules defines which information is required from the end-users. The required information may be a name, an email, an address, a telephone number, etc. Optionally, the received information is forwarded to the content provider, stored in a designated repository that is connected to the access management system 1, or both.

Optionally, the Content Provider can require that for any End-User that accesses his content, some or all of the End-User personal information will be delivered to the Content Provider via the API.

Optionally, in cases where the Content Provider wishes to distinguish between different users but does not need their personal information, the access system can pass a unique identifier to the Content Provider using the API. By this, the Content Provider can still maintain behavioral and access analysis of different users who access his content. For example, the content provider can identify reading habits of different users, and still not even know who the user really is—since the unique identifier will be the same each time the users accesses the content. For example, using this method, Content Providers can save their users from the need to register to the site and still maintain marketing information about the user, and the user can enjoy anonymity from the content provider.

Optionally, the End-User can instruct the access system not to provide any of his personal information to some or all of the Content Providers. In such case where the Content Provider requires personal information, as defined above, and the End-User does not wish to provide it, the user will not have access to the Content.

Optionally, the access management system 1 comprises a configuration unit (not shown) that allow the operator of the access management system 1 to configure network access requirements for each one of the content sources that the concealed address thereof is stored in the access management unit 5. Optionally, the configuration unit allows the content providers to configure the network access requirements of their content sources.

Optionally, the configuration of the network access requirements is based on data that is updated by the operator of the access management system 1, by the content provider, or by both. The configuration unit allows the editing of on one or more of the following:

1. the concealed address of the content source of the content provider—the IP address and optionally the domain name of the domain that hosts the content source on the network 8 or any other indicator that links to the domain wherein the contact source resides;
2. the set of hiding rules;
3. the set of billing rules;
4. a list of one or more users with user specific access rights—the configuration unit may be used for defining adjusted network access rights to a number of different end-users;
5. a set of quality of service (QoS) rules;
6. a set of editing permissions; and
7. a set of identity rejections rules.
8. API Configurations.
9. Custom tags configuration.

As described above, the access management system 1 manages network accesses of end-users to the content sources of a number of content providers. Optionally, each content provider account comprises a collection of all of the information that is related to the content provider. It contains one or more of the following records:

1. A fund account record—a record that stores an address for sending the accumulated funds collected from the end-users for accessing related billable content sources.
2. A delivery record—a record that stores information about the delivery of the accumulated funds collected from the end-users for accessing related billable content sources to the fund account of the related content provider. For example, accumulated funds may be transferred each month or only when there a certain amount of funds has been accumulated.
3. A service fee—a record that stores information that defines how much the content provider pays for the service. The system operator preferably determines the service fee. The service fee may be a fixed percentage of the funds, which are collected for the content provider, a monthly fee, a variable percentage of the funds, which are collected for the content provider, or any combination thereof.

Optionally, as described above, the content provider may instruct the access system according to different billing rules by embedding custom tags in the concealed content. The custom tags are interpreted by the access system and removed from the content that is delivered to the end-user. For example, such a custom tag may include a code that instructs that the access system to charge $20 for the access to a certain link within the source content.

As described above, all the communication between the content source and the end-user passes via the content proxy units 4. Optionally, the content proxy units 4 contact the management access unit 5 in order to authenticate the end-user. In such an embodiment, the content proxy units 4 redirect access requests from the user-terminals 2 to the access management unit 5 that authenticates the related end-user 3. Once the end-user 3 is authenticated, the access management unit 5 sends a confirmation message to the content proxy unit 4 and redirects the end-user back to the content proxy units 4. A session connection 4 is maintained between the content proxy unit 4 and the access management unit 5, as long as the end-user access session is active. If the connection is lost, the end-user is not billed and the content source is no longer provided. Such a method helps to prevent fraudulent acts by content providers and hides the end-user accounts and passwords from the content providers.

Optionally, the rates of accessing content sources are stored on the content proxy units 4. In such an embodiment, if a security problem arises, for example if there is suspicion that the content proxy unit 4 has been altered or accessed by an unauthorized person, the content proxy unit 4 switches to verbose mode.

Optionally, one or more of the domains 8 that host the content sources host a security plug-in. In such an embodiment, a content proxy unit 4 is flagged as a suspicious unit when a fraud is suspected. When an end-user accesses one of the domains 8 via a suspicious unit, the security plug-in sends, optionally directly, a usage summary to the access management unit 5. The usage summary is compared with the documented usage information and optionally reported to the end-user 3. Optionally, all the content proxy units 4 are registered at the access management unit 5, the domains 8, or both. In such an embodiment, only registered content proxy units 4 are allowed to communicate with the domains 8. A content proxy unit 4 may be registered by a network address, a certificate, a pre-shared key, etc.

Figure 6:
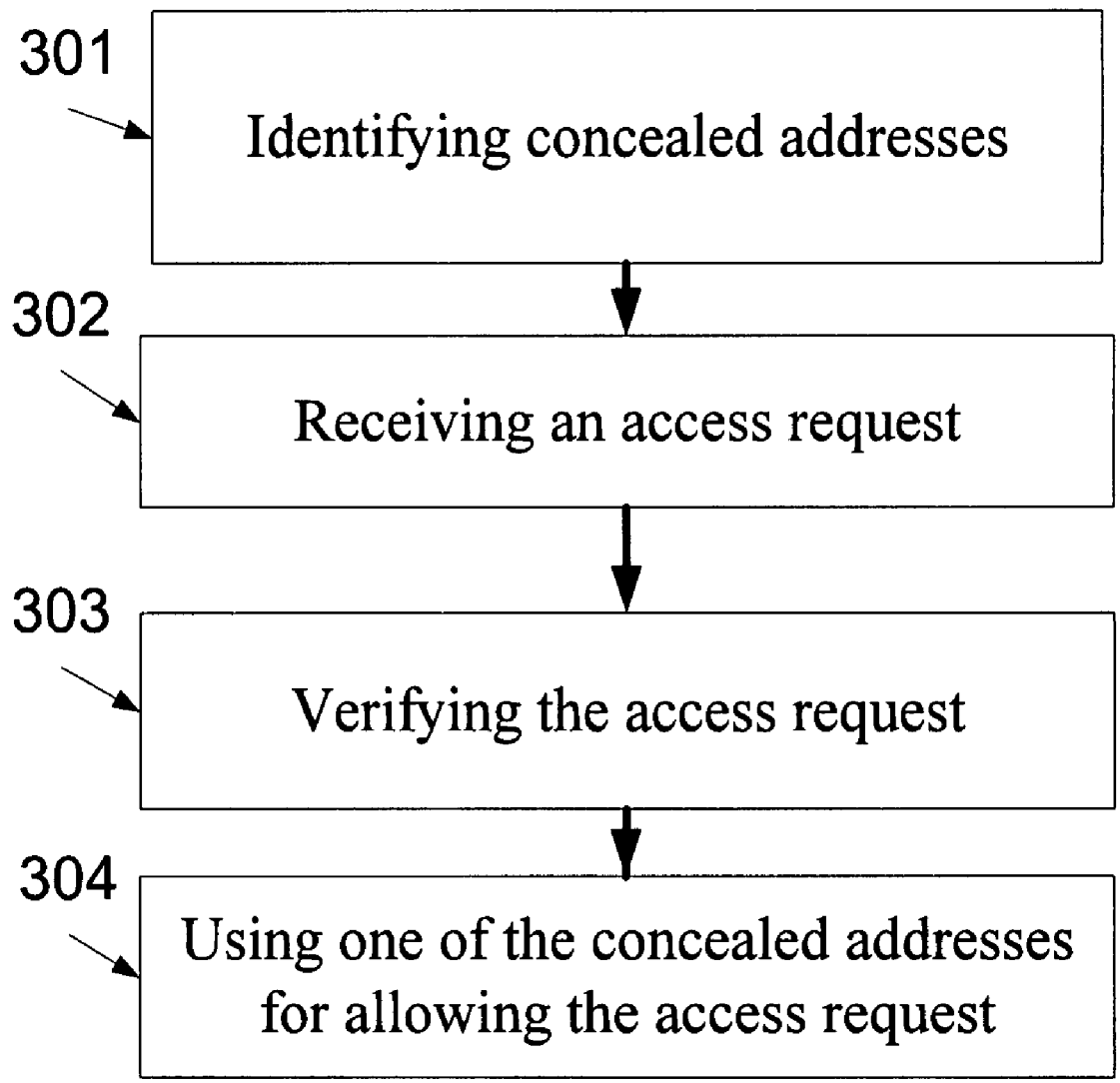
FIG. 6 is a flowchart of method for managing access to a number of content sources of a number of different content providers, according to one embodiment of the present invention.

Reference is now made to FIG. 6, which is a flowchart of method for managing access to a number of content sources of a number of different content providers, according to one embodiment of the present invention.

Each one of the plurality of content sources has a concealed address that indicates the actual storage location thereof. The concealed address is not publicly available, as described above. As shown at 301, one or more concealed addresses of one or more related content sources are identified. During the next step, as shown at 302, a request for accessing one or more of the content sources is received from one of the end-users. Optionally, the request comprises one or more content indicators, such as publicly available URLs, which are independently associated with the requested content sources and may be used for tracing a certain content source that is available online. Unlike the content indicator, which is available to search engines and users, the concealed address is available only for a limited number of network entities, as described above. As described above, the content proxy unit receives the request and forwards it to the access management unit. Then, as shown at 303, the request is checked in order to verify whether the end-user is authorized to access the requested content sources or not. Optionally, the availability of funds at a balance account of the requesting end-user is checked before the access is authorized. If the authorization is granted, the end-user may access the domain that stores the content source using the concealed address, as described above and shown at 304.

It is expected that during the life of this patent many relevant devices and systems will be developed and the scope of the terms herein, particularly of the terms a server, an applet, a unit, a module, a system, a user terminal, and a network are intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents, and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. An access management system for managing network access of a user terminal of an end-user to at least one of a plurality of online content sources of a plurality of content providers, said user terminal and plurality of online content sources being connected to a computer network, comprising:
   a computing platform connected to said computer network and comprising:
   a content proxy unit which stores a concealed address which defines the storage location of each said online content source, said content proxy unit receives an access request for an access to at least one of said plurality of online content sources over said computer network from said user terminal; and
   an access management unit which stores an access rights record pertaining to said end-user, said access management unit authorizes said access request according to said access rights record;
   wherein said content proxy unit facilitates said network access by establishing an access session between said user terminal and said at least one of said plurality of online content sources, during which said proxy unit forwards to said user terminal content from said at least one online content source in said authorized access request using at least one of said concealed addresses, without providing said at least one concealed address to said user terminal; and
   wherein said access management system generates a fake address and provides said fake address for presentation on said user terminal; and
   wherein said content proxy unit receives a request for content using said fake address from said user terminal and replaces said fake address by at least one of said concealed addresses and forwards said request with said replacement concealed address to a corresponding online content source.

2. The access management system of claim 1, wherein said access request is designated to said at least one of the plurality of content providers, said designated at least one content provider hosting said requested at least one content source.

3. The access management system of claim 1, wherein said access request comprises a publicly available uniform resource locator (URL), said publicly available URL being associated with said content proxy.

4. The access management system of claim 3, wherein said at least one of said concealed addresses is determined according to said publicly available URL.

5. The access management system of claim 1, wherein said access management unit stores an access condition for at least one of said plurality of online content sources, said access management unit allows said access session according to a respective access condition.

6. The access management system of claim 5, wherein said access management unit allows each said content provider to define at least one of said access conditions.

7. The access management system of claim 1, wherein said access rights record comprises a balance account configured for being updated according to said access session.

8. The access management system of claim 5, wherein each said access condition is associated with an access fee, said access rights record being associated with a balance account configured for being charged for said access fee when a respective said content source is accessed by the end user.

9. The access management system of claim 1, wherein said access management unit is configured for storing a plurality of access rights records, each said access rights record pertaining to another end-user, said content proxy unit being configured for receiving said request from each said another end-user, and authorizing said access request according to respective said access rights record.

10. The access management system of claim 1, wherein said access rights record comprises a member of the following group: login information of the end user, billing information regarding the end user, an anonymity level that defines the availability of said access rights record to third parties, shipping information of the end user, and contact information of the end user.

11. The access management system of claim 1, wherein said access management unit is configured for establishing a connection with a billing server, said connection being used for billing said end-user for said access session.

12. The access management system of claim 1, wherein said access management unit is configured for billing said end-user for said access session, said billing is performed according to a tag embedded in the content forwarded by the proxy unit to the user-terminal.

13. The access management system of claim 12, wherein the embedded tag defines billing rules and terms, and wherein the content proxy unit removes said embedded tag before it forwards the content to the user terminal.

14. The access management system of claim 11, wherein said connection is used for updating said access rights record.

15. The access management system of claim 11, wherein said access management unit is configured for authenticating said connection.

16. The access management system of claim 1, wherein said computing platform further comprises a verification unit which verifies said access session with said end-user.

17. The access management system of claim 1, wherein said user terminal hosts a supporting application program which authenticates said access request.

18. The access management system of claim 1, wherein said content proxy unit detects a termination of said access session.

19. The access management system of claim 1, wherein said access rights record is pertaining to a cooperate server, said content proxy unit authenticates said access request with said cooperate server, said access session being determined according to said access rights record and said authentication.

20. A computer implemented access managing method for managing network access of a user terminal of an end-user to at least one of a plurality of online content sources of a plurality of content providers, said user terminal and plurality of online content sources being connected to a computer network, said access managing method comprising providing a computing platform connected to said computer network and configured to manage said network access as follows:
   a) identifying a concealed address which defines a storage location of each one of the plurality of online content sources, each said concealed address being associated with one of said plurality of online content sources;
   b) receiving an access request from said user terminal for an access to at least one of said plurality of online content sources;
   c) generating a fake address;
   d) verifying if the end-user is authorized to access said at least one online content source; and
   e) establishing an access session between said user terminal and said at least one online content source during which said computing platform forwards said fake address and content to said user terminal from said at least one content source in said authorized access request using at least one of said concealed addresses, without providing said at least one concealed address to said user terminal, by said computing platform replacing said concealed address with said fake address for forwarding to said user terminal.

21. The computer implemented access managing method of claim 20, further comprising a step of billing said end-user by said computing platform for said access session.

22. The computer implemented access managing method of claim 21, wherein said verifying comprises a step of reserving funds for said billing.

23. The computer implemented access managing method of claim 20, further comprising a step of altering the concealed addresses of said at least one of said online content sources, thereby hiding said at least one of said concealed addresses.

24. The computer implemented access managing method of claim 21, further comprising a step of sending the end user information about said billing.

25. The computer implemented access managing method of claim 20, further comprising a step before step b) of storing an access rights record of the end-user, said verifying being performed according to said access rights record.

26. The computer implemented access managing method of claim 25, wherein said access rights record comprises a balance account of said end-user, further comprising a step f) of updating said balance account according to said access session.

27. The computer implemented access managing method of claim 20, further comprising a step between step d) and step e) of authenticating said access request, wherein step d) being performed if said access request has been authenticated.

28. The computer implemented access managing method of claim 25, wherein said access rights record comprises a balance account.

29. The computer implemented access managing method of claim 28, further comprising a step between step b) and step c) of reserving funds in said balance account according to said access request.

30. The computer implemented access managing method of claim 20, wherein said access session comprises a step of allowing a member of the following group: downloading a copy of said at least one of said plurality of online content sources, receiving a video stream of said at least one of said plurality of online content sources, using an online service, receiving an audio stream of said at least one of said plurality of online content sources, browsing one or more webpages of said at least one of said plurality of online content sources, and copying images or documents from said at least one of said plurality of online content sources.

31. The computer implemented access managing method of claim 23, wherein said altering defines the content source in a manner that said content source being accessible via the content proxy unit.

32. An access management system for allowing a plurality of content providers to jointly restrict network access to their content, said content being stored at a respective content source of each said content provider, said respective content source being connected to a computer network, comprising:
   a common access proxy server connected to said computer network which provides a plurality of content provider accounts, each said content provider account comprising a concealed address which defines a storage location of said respective content source and a public address of said respective content source, said concealed address being an address leading to respective content at said content provider, and said public address being published, said common access proxy receives from a user terminal of an end-user an access request comprising at least one of said public addresses for accessing a corresponding content source; and
   a verification unit which verifies said end-user in response to said access request;
   wherein said common access proxy facilitates access of said verified end-user to said requested content source by establishing an access session between the user terminal of said verified end-user and said requested content source during which content is forwarded by said common access proxy to said user terminal using the concealed address of said requested content source, without providing said concealed address to said user terminal; and
   wherein said access management system generates a fake address and provides said fake address for presentation on said user terminal;
   wherein said common access proxy receives a request for content using said fake address from said user terminal and replaces said fake address by at least one of said concealed addresses and forwards said request with said replacement concealed address to a corresponding online content source.

33. The access management system of claim 32, wherein said common access proxy and said verification unit are hosted on a common server.

* * * * *